Jan. 1, 1935.  G. I. HIPPLE  1,986,437
SHAFT COUPLING
Original Filed July 13, 1933
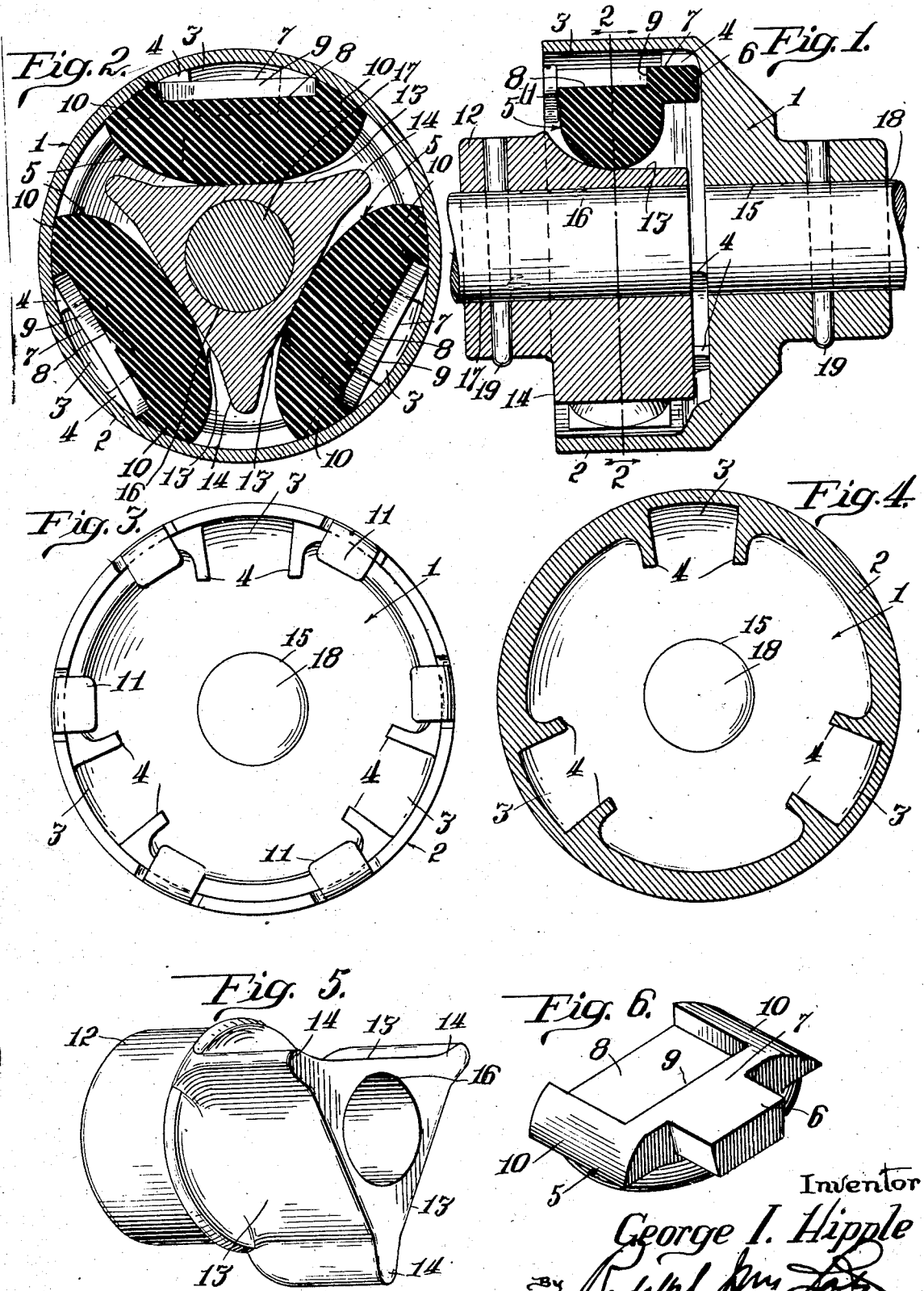
Inventor
George I. Hipple
By Rudolph [signature]
Attorney Patented Jan. 1, 1935

1,986,437

UNITED STATES PATENT OFFICE 1,986,437

SHAFT COUPLING

George I. Hipple, Chicago, Ill.

Application July 13, 1933, Serial No. 680,193
Renewed June 11, 1934

11 Claims. (Cl. 64—96)

This invention relates to improvements in shaft couplings and has for its object to provide a device of this character which is sufficiently flexible to permit a driving and a driven shaft to be out of axial alignment and angularly disposed to each other to a degree, in either or both instances, that would obviate the successful use of the various types of shaft-couplings that are purchasable in the market at this time, so far as I am informed.

Other objects of the invention are to provide a shaft coupling that is very simple in construction, is inexpensive and which also is easily and quickly repaired at very small expense.

A suitable embodiment of the invention is illustrated in the accompanying drawing wherein:

Fig. 1 is a central longitudinal sectional view of a shaft coupling constructed in accordance with the invention.

Fig. 2 is a transverse section of the same on the line 2—2 of Fig. 1.

Fig. 3 is a view in elevation of the open end of the casing of one member of the coupling.

Fig. 4 is sectional view of the same on the line 4—4 of Fig. 2.

Fig. 5 is a perspective view of the male member of the coupling.

Fig. 6 is a perspective view of one of the flexible cushions of the female member of the coupling.

The present invention relates particularly to that type of shaft coupling wherein flexible elements are employed to transmit motion from a driving to a driven member. In the prior art, as known to me, this has been accomplished by means of the interposition of blocks of rubber between the said members and in said structures, a compression of the rubber blocks is relied upon to take up variations in relative movement of the said member due to their dis-alignment or relatively angular disposition or both.

In the prior art structures, as far as the same are known to me, the results of the particular application of force on the rubber blocks has produced surface friction of a high degree which causes the rubber blocks to become heated to a destructive degree, with the result that they had to be renewed every few hours, unless the coupled shafts are almost perfectly aligned.

The invention herein illustrated and described, includes the use of flexible and preferably vulcanized rubber blocks interposed between a driving and a driven member wherein said blocks are so constructed and arranged as to avoid the surface friction referred to and the compression of the blocks themselves, the result being achieved by a distortion of the blocks and without any substantially or appreciable friction thereon.

The invention includes means whereby ample circulation of air is provided around the blocks for the absorption of such heat as may be generated, thus preventing the heating of said blocks or members to a destructive degree.

Referring now to the drawing, it will be noted that the coupling comprises a female member (1) having a cylindrical cavity (2) therein which is equipped with an inner cylindrical face from its mouth portion to a point adjacent the bottom thereof. In the bottom portion of the member (2), I provide what may be termed socket formations (3) bordered in part by inwardly-extending flanges (4), which are slightly convergent to retain the elements received therein.

Blocks of flexible vulcanized rubber or other suitable material shown in perspective in Fig. 6 (6) are mounted in the member (2). Each of said blocks comprises a body portion (5) equipped with a rectangular shank (6) on its lower face and having a rear face flush with the flat rear face (7) of said block. In said rear face, I provide a rectangular recess (8) which is open at the top, is of greater width than said shank (6) and is spaced from the latter by a shallow wall portion (9). The side walls of said recess (8) are disposed at the meeting point of arcuate end surfaces (10) of said block which are of a radius equal to that of the member (2) and which hug the latter above the socket formations and upper ends of the said flanges (4).

The other, or front face, of the block (6) is a double convex contour having a long radius from one side edge to the other of said block and a short radius vertically of the block, the highest point in said face being opposed substantially to the middle of the recess (8).

Preferably, only three of said blocks are provided, as well as three of said socket formations (3) to receive the shanks of said three blocks, the latter being mounted in place by inserting the shank (6) in said sockets (3) with the recess (8) and the arcuate side edge portion of the blocks opposed to the inner cylindrical face of the member (2). The member (2), as herein illustrated, is equipped with a series of bendable tongues or projections (11) along its outer edge which are bent over as shown in Fig. 3, to hold the blocks (5) against longitudinal movement relatively to the member (2), but in practice, I find that said tongue (11) may be omitted if desired.

The male member of the coupling comprises a cylindrical portion (12) terminating in a substantially triangular portion (14) presenting three equal flat faces disposed equi-distantly from each other about the axes of said member (12), said flat faces merging into outwardly-extending flanges or projections (14) along arcuate surface portions connecting said flat faces (13) with the side faces of said projections (14).

Both the female member (1) and the male member (12) are provided with central bores (15 and 16) respectively, to receive the shafts (17 and 18), one of which is driven and the other of which is the driving shaft. In the instance illustrated, the said shafts (17 and 18) are secured in said male and female members by means of pins (19), but any other mode of securing the same in place may be used.

After the blocks (5) have been inserted into the female member (2), as shown in Fig. 2, the triangular end portion of the male member (12) is inserted into said female member with the middle portion of each of the flat faces (13) engaged with the highest point in the inner double convex faces of the respective blocks (5).

Assuming the male member (12) to be the driving member, it will be noted that upon a rotation thereof relatively to the female member, the said flat faces will roll over the double convex faces of the blocks (5) without slippage along the same, until the flanges (14) engage the opposing portions of said blocks (5), whereupon a slight distortion of the blocks (5) will take place and this distortion is taken up in the hollows between the rear faces of the blocks (5) and the opposed arcuate wall of the member (2). In practice, it is found that the said distortion rarely takes place for the reason that the female member which is the driven member, will respond to the pressure exerted by the male member before said flanges (14) come into contact with the blocks (5) and thus the relative rotary movement between the member (12) and the member (2) is limited to a very short arc.

In the event that the member (2) is angularly disposed axially with respect to the member (12), the aforesaid rolling action will occur longitudinally of said members (12 and 14) in the degree fixed by the angle formed between the axes of male and female members. This is rarely of appreciable degree, but by reason of the high degree of flexibility afforded by the blocks (5) due to the hollow spaces behind the same, as above pointed out, it has been found that there is substantially no skin friction at the points of contact of the faces (13) with the double convex faces of the said blocks.

The rotation of the male and female members provides a constant and ample circulation of air within the female member and about the exposed surfaces of the blocks (5) to maintain the latter sufficiently cool to prevent injury thereto by heat.

The structure is obviously very simple and cheap and permits of easy removal and replacement of blocks (5) when required.

I claim as my invention:—

1. A shaft coupling comprising a casing equipped with sets of inwardly projecting retaining devices spaced equidistant from each other, flexible members each having a projection at one end engaged with one set of said devices, the body-portion of each of the said flexible members having a double-convex inner face and having outer side edge portions disposed in contact with the inner face of the peripheral wall of said casing, there being a recess in the outer face of said body portion extending from the outer end thereof to a point contiguous to the junction of the body portion and said projection and between said side edge portions to render said body portion substantially hollow, and a male member presenting straight flat walls opposed to and in surface contact with the double convex surfaces of said flexible members.

2. A shaft coupling comprising a cylindrical casing closed at one end and equipped with a plurality of socket formations contiguous to the closed end and adjacent its inner peripheral wall, said formations being equidistant from each other, a plurality of flexible members each equipped with a shank engaged in one of said socket formations and each comprising a body portion having a double convex inner face and a recess in its rear face opposed to the middle portion of said double-convex face thereof to provide an air-pocket between said body portion and the cylindrical wall of said casing, the side edge portion of said body portions opposed to said cylindrical wall being arcuate to correspond to and hug said wall, and a male member projecting into said casing and equipped with a polygonal end portion presenting a number of equal straight flat faces corresponding to the number of the said flexible members, the middle portions of said flat faces being in close contact with the middle portions of the double convex faces of said flexible members.

3. A shaft coupling comprising a cylindrical casing closed at one end and equipped with a plurality of socket formations contiguous to its closed end and adjacent its inner peripheral wall, said formations being equidistant from each other, a plurality of flexible members each equipped with a shank engaged in one of said socket formations and each comprising a body portion having a double convex inner face and a recess in its rear face opposed to the middle portion of said double convex face thereof to provide an air-pocket between said body portion and the cylindrical wall of said casing, the side edge portions of said body portions constituting the sole points of contact with the inner cylindrical face of the casing, and a male member projecting into said casing and equipped with a polygonal end portion presenting a number of equal straight flat faces corresponding to the number of the said flexible members, the middle portions of said flat faces being in close contact with the middle portions of the double convex faces of said flexible members.

4. A shaft coupling comprising a cylindrical casing closed at one end and equipped with a plurality of socket formations contiguous to its closed end and adjacent its inner peripheral wall, said formations being equidistant from each other, a plurality of flexible members each equipped with a shank engaged in one of said socket formations and each comprising a body portion having a double convex inner face and a flat outer face opposed to the inner cylindrical face of the casing, with the side edge portions of said rear face in contact with the latter and a male member projecting into said casing and equipped with a polygonal end portion presenting a number of equal straight flat faces corresponding to the number of the said flexible members, the middle portions of said flat faces being in close contact with the middle portions of the double convex faces of said flexible members.

5. A shaft coupling comprising a cylindrical casing closed at one end and equipped with a plurality of socket formations contiguous to its closed end and adjacent its inner peripheral wall said formations being equidistant from each other, a plurality of flexible members each equipped with a shank engaged in one of said socket formations and each comprising a body portion having a double convex inner face and an outer face of a contour to provide an air space between the latter and the inner cylindrical face of the casing and a male member projecting into said casing and equipped with a polygonal end portion presenting a number of equal straight flat faces corresponding to the number of the said flexible members, the middle portions of said flat faces being in close contact with the middle portions of the double convex faces of said flexible members.

6. A shaft coupling comprising a cylindrical casing equipped with three equal and equally spaced apart flexible members, each of the latter presenting an inner double convex face of shorter diameter in the planes of the axis of said cylindrical casing than in planes transversely disposed to said axis, the outer faces of said members being of contour to provide free spaces between them and the opposed inner cylindrical face of the casing, the side edge portions of said members being engaged with said casing and a male member projecting into said casing and equipped with a polygonal end portion presenting a number of equal straight flat faces corresponding to the number of the said flexible members, the middle portions of said flat faces being in close contact with the middle portions of the double convex faces of said flexible members.

7. A shaft coupling comprising a cylindrical casing equipped with three equal and equally spaced apart flexible members, each of the latter presenting an inner double convex face of shorter diameter in the planes of the axis of said cylindrical casing than in planes transversely disposed to said axis, the outer faces of said members being of contour to provide free spaces between them and the opposed inner cylindrical face of the casing, the side edge portions of said members being engaged with said casing and a male member projecting into said casing and equipped with a polygonal end portion presenting a number of equal straight flat faces corresponding to the number of the said flexible members, the middle portions of said flat faces being in close contact with the middle portions of the double convex faces of said flexible members and outwardly projecting flanges at the corners of the male member disposed in the spaces between the flexible members of said casing.

8. A shaft coupling comprising a casing equipped with sets of inwardly projecting retaining devices spaced equidistant from each other, flexible members each having a projection at one end engaged with one set of said devices, the body portion of each of the said flexible members having an inner face and having outer side edge portions disposed in contact with the inner face of the peripheral wall of said casing, there being a recess in the outer face of said body portion extending from the outer end thereof to a point contiguous to the junction of the body portion and said projection and between said side edge portions to render said body portion substantially hollow, and a male member presenting straight flat walls opposed to and in surface contact with the inner surfaces of said flexible members.

9. A shaft coupling comprising a cylindrical casing equipped with a plurality of equal and equally spaced apart flexible members, the outer faces of said members being of contour to provide free spaces between them and the opposed inner face of the casing, the side edge portions of said members being engaged with said casing, a male member projecting into the said casing and equipped with a polygonal end portion presenting a number of faces corresponding with the number of said flexible members, said faces being substantially flat and normally engaged at their middle portions with the middle portions of the inner faces of said flexible members.

10. A shaft coupling comprising a cylindrical casing equipped with a plurality of equal and equally spaced apart flexible members, the outer faces of said members being of contour to provide free spaces between them and the opposed inner face of the casing, the side edge portions of said members being engaged with said casing, a male member projecting into the said casing and equipped with a polygonal end portion presenting a number of faces corresponding with the number of flexible members, said faces being substantially flat and normally engaged at their middle portions with the middle portions of the inner faces of said flexible members, said inner faces being shaped to cause different portions, thereof, to engage the opposed faces of the male member as the latter rotates relatively to the female member under the influence of power applied to one of said members for transmission to and through the other thereof.

11. In a shaft coupling, a hollow casing of generally circular form for attachment to the end of one shaft section, a plurality of resiliently yieldable blocks arranged about the inner wall of the casing in equally spaced relation circumferentially of the casing, means for holding the blocks against any substantial movement circumferentially of the casing, and a member in the casing for attachment to the end of another shaft section, said blocks being generally convex toward the center of the member, and the portions of the member opposite the blocks being generally concave toward the latter, with the intervening portions of the member spaced from the sides of the blocks in generally angular outwardly diverging relation thereto, whereby to permit of a wedged engagement between the member and each of the blocks over a progressively increasing area under an increase in torque.

GEORGE I. HIPPLE.